March 9, 1926.
E. O. YOUNG
SLOT PROTECTOR FOR AUTOMOBILE FLOOR MATS
Filed Dec. 16, 1925
1,576,493
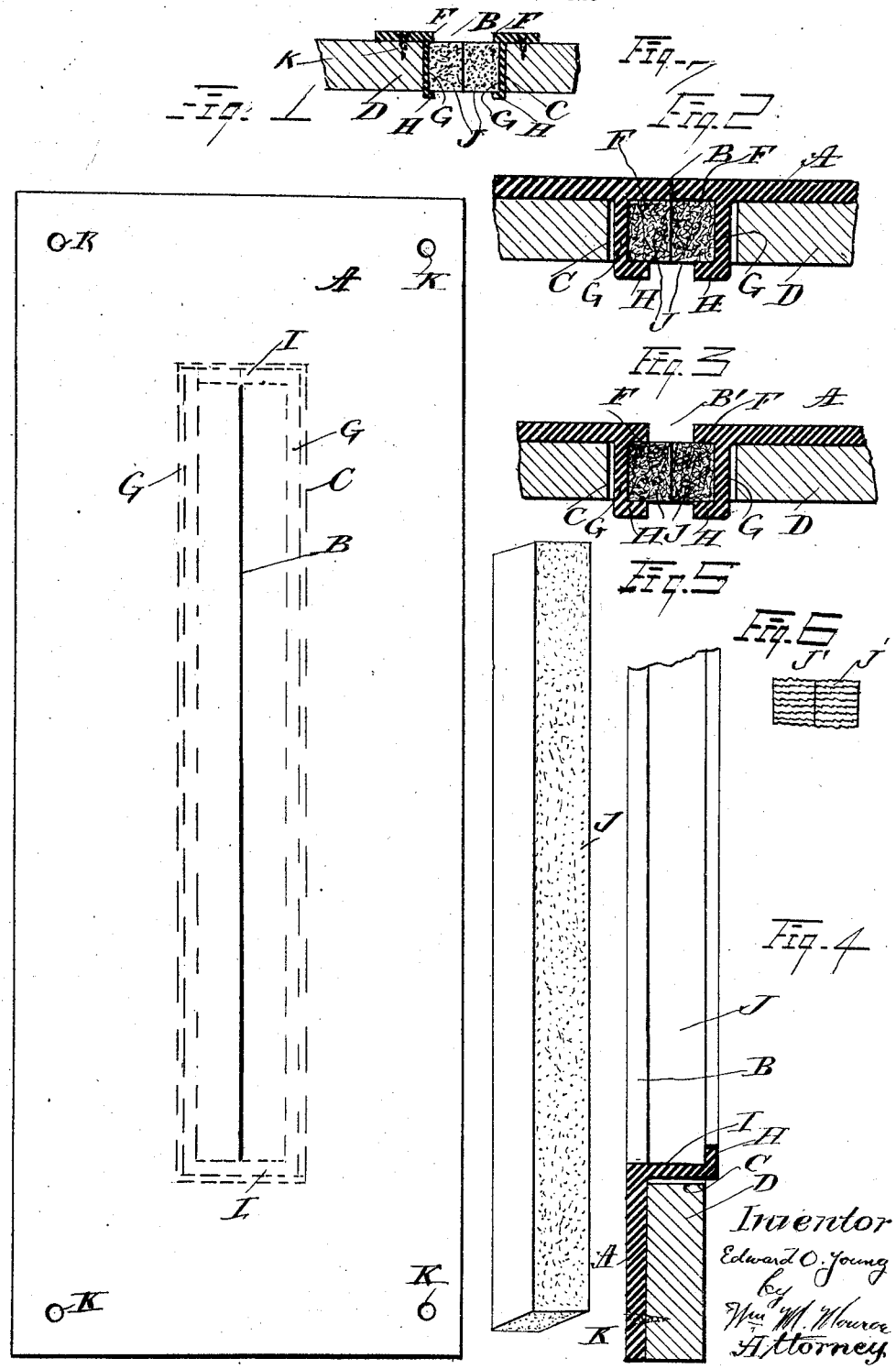

Patented Mar. 9, 1926.

1,576,493

UNITED STATES PATENT OFFICE.

EDWARD O. YOUNG, OF CLEVELAND, OHIO.

SLOT PROTECTOR FOR AUTOMOBILE FLOOR MATS.

Application filed December 16, 1925. Serial No. 75,726.

*To all whom it may concern:*

Be it known that I, EDWARD O. YOUNG, a citizen of the United States, residing at Cleveland, in the county of Cuyahoga and State of Ohio, have invented certain new and useful Improvements in Slot Protectors for Automobile Floor Mats, of which the following is a specification.

The objects of the invention are to provide means for closing the slots in the floor mat of an automobile through which the shanks of the pedal levers pass to prevent cold air, gas or dust from entering them, and the device is so constructed that the levers will have a free passage through the slots, but the slots will automatically close behind them.

To accomplish this object a rubber mat is provided with a narrow linear slit or slot, the sides of which are readily parted to permit the passage of the lever, and a boxlike enclosure is provided adjacent to the slot in the mat in which, rectangular slabs or strips of sponge rubber are secured which are soft and resilient and while yielding readily to the passage of the lever, close tightly behind it.

They also have the advantage over slot linings composed of wool, felt, or fibre, that they are impervious to the passage of oil or the fumes of gas, cold air and dust, and are water proof, and therefore have great wearing qualities, and are composed of the same substance as the mat and can be vulcanized or cemented thereto, and hence fill a long felt want for a slot closing device, which is economical in initial cost, and requires no labor in assembling the parts, since the parts may be integrally constructed.

The device is hereinafter described, illustrated in the accompanying drawings and specifically pointed out in the claims.

In the accompanying drawings Fig. 1 is a plan of the mat, showing one slot therein, Fig. 2 is a transverse section thereof.

Fig. 3 is a transverse section of a modification thereof.

Fig. 4 is a longitudinal section on center line of Fig. 1 and Fig. 5 is a perspective of one of the sponge rubber inserted slabs or strips.

Fig. 6 is a transverse section of a rubber crape filling.

Fig. 7 is a section of a hard rubber mat.

In these views, A represents the rubber mat. B the slot therein, C is the slot beneath the mat in the wooden flooring D of the car.

A boxlike structure is formed beneath the mat from the edges F, F, of the slot B and side and narrow bottom walls G, H, and end walls I, I, respectively which depend from the mat.

Rectangular slabs J, J, composed of resilient water proof material, preferably of sponge or crape rubber, are inserted in this enclosure and are retained therein, by the wooden or metal walls of the slot C, of the floor D. For this reason the side and end walls of the enclosure may be thin and are not placed under tension.

The end walls I of the enclosure prevent the rubber slabs from creeping and escaping from the inclosure as the shank of the pedal is reciprocated therein.

If rubber crape is employed it may be constructed in layers of any thickness desired, as shown in Fig. 6 at J, and may or may not be vulcanized, sewed or cemented together as may be convenient.

The rubber slabs can be easily withdrawn when they become hardened or worn from use and others substituted therefore thus making the device convenient and inexpensive for general use, and providing a slot filling that is water and oil proof and easily renewed.

If desired the edges of the slot in the mat may be left open at B' so that the wear will be only upon the rubber slabs beneath.

In the device shown in Fig. 3 the mat and boxlike enclosure may be formed wholly of vulcanized hard rubber or of a composition such as bakelite or other rigid material and be perfectly rigid if desired, since the resilient filling can be compressed to introduce it into place, but when made of soft rubber the walls of the wooden floor slot will retain the filling in place.

If the walls of the device are rigid it can be reversed and the device can project above the floor.

Openings K. K. are shown for attaching the mat to the floor.

As shown in Fig. 7 the mat or support for the slabs is narrow and is formed of hard rubber or other rigid material in two parts, attached upon opposite sides of the slot C in the floor, and the parts can be removed with the floor planks when taking up the floor.

Having described the invention what I claim as new and desire to secure by Letters Patent is:

1. An automobile floor mat provided with a linear slot for the passage of the shank of a pedal lever, and an enclosure adjacent to said slot; said enclosure being provided with side, bottom and end retaining walls, and slabs of resilient water proof material, seated in said enclosure.

2. A rubber automobile floor mat provided with a linear slot therein, and a floor upon which said mat rests, said floor having a registering slot therein, of resilient water proof material adjacent to the edges of said slot in said mat, and positioned within the slot in said floor, and retaining means for said material.

3. In a device of the character described, a floor mat having a linear slot therein and slabs of resilient oil and waterproof material, detachably secured upon each side of said slot, the contacting edges of said slabs registering with the vertical plane of said slot to permit the passage of the pedal shank through said slot and between said slabs.

4. In a device of the character described, a floor mat having a linear slot therein and slabs of resilient oil and water proof material, detachably secured upon each side of said slot, the contacting edges of said slabs registering with the vertical plane of said slot to permit the passage of the pedal shank through said slot and between said slabs and means for securing said slabs in said registering position.

5. In a device of the character described a slotted floor mat, a slab of sponge rubber upon each side of said slot and a rigid enclosure for said slabs, said enclosure slotted to permit the passage of a pedal shank therethrough.

6. The combination with the slotted floor of a car, of a slotted enclosure and a pair of resilient water proof slabs inserted therein, the slots in said enclosure, registering with the slot in said floor, and with the parting line between said slabs.

7. In a device of the character described, a rigid support formed in opposed portions, a floor having a slot upon the sides of which said portions are attached, a pair of opposed resilient slabs secured to said opposed portions of said support.

8. In a device of the character described, a rigid support formed in opposed portions, a floor having a slot upon the sides of which said portions are attached, a pair of opposed resilient slabs secured to said opposed portions of said support, and retaining means for said slabs upon the portions of said support.

9. In a device of the character described, a floor having a linear slot therein, a floor mat formed in two portions, separated by said floor slot and attached to said floor on each side of said slot, a pair of resilient flexible slabs adjacent to the opposed edges of said mat, the parting line between said slabs registering with said slot, and means attached to said mat for retaining said slabs in place.

In testimony whereof I affix my signature.

EDWARD O. YOUNG.